US009454696B2

(12) United States Patent
Campanelli et al.

(10) Patent No.: US 9,454,696 B2
(45) Date of Patent: Sep. 27, 2016

(54) DYNAMICALLY GENERATING TABLE OF CONTENTS FOR PRINTABLE OR SCANNED CONTENT

(71) Applicant: XEROX CORPORATION, Norwalk, CT (US)

(72) Inventors: Michael R. Campanelli, Webster, NY (US); Saurabh Prabhat, Webster, NY (US); Raja Srinivasan, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/254,976

(22) Filed: Apr. 17, 2014

(65) Prior Publication Data

US 2015/0304521 A1     Oct. 22, 2015

(51) Int. Cl.
G06F 3/12 (2006.01)
G06K 9/00 (2006.01)
G06K 15/02 (2006.01)
H04N 1/387 (2006.01)

(52) U.S. Cl.
CPC ....... G06K 9/00469 (2013.01); G06K 15/1889 (2013.01); H04N 1/3873 (2013.01)

(58) Field of Classification Search
None
See application file for complete search history.

(56) References Cited

U.S. PATENT DOCUMENTS

| 6,002,798 | A | 12/1999 | Palmer et al. |
| 7,317,543 | B2 | 1/2008 | Gnutzmann |
| 7,860,316 | B2 | 12/2010 | Ohk |
| 7,908,284 | B1 | 3/2011 | Mathes et al. |
| 8,250,469 | B2 | 8/2012 | Dresevic et al. |
| 8,369,623 | B2 | 2/2013 | Ohk |
| 2003/0042319 | A1* | 3/2003 | Moore .......................... 235/494 |
| 2007/0198912 | A1* | 8/2007 | Meunier ....................... 715/509 |
| 2010/0245875 | A1 | 9/2010 | Komaki |
| 2011/0091108 | A1* | 4/2011 | Oshima ......................... 382/173 |
| 2011/0249299 | A1* | 10/2011 | Wu et al. ..................... 358/3.26 |
| 2012/0143826 | A1* | 6/2012 | Spektor et al. ............... 707/649 |
| 2013/0139053 | A1* | 5/2013 | Le Chevalier et al. ...... 715/255 |

* cited by examiner

Primary Examiner — John Wallace
(74) Attorney, Agent, or Firm — Gibb & Riley, LLC

(57) ABSTRACT

Methods and devices receive a document comprising raster images, using an optical scanner. These methods and devices automatically identify topical items within the raster images based on raster content in the raster images, using a processor. Further, these methods and devices automatically associate the topical items with topics in the document based on previously established rules for identifying topical sections, and automatically crop the topical items from the raster images to produce cropped portions of the raster images, using the processor. These methods and devices then automatically create an index for the document by combining the cropped portions of the raster images organized by the topics, using the processor, and output the index from the processor.

8 Claims, 9 Drawing Sheets

160

S. Lefèvre, C. Dixon, C. Jeusse, N. Vincent : A Local Approach for Fast Line Detection
RFAI publication: IEEE International Conference on Digital Signal Processing, Santorini (Greece), July 2002, pp. 1109-1112

A Local Approach for Fast Line Detection

Sébastien Lefèvre [1,2], Charles Dixon [1], Cédric Jeusse [1], Nicole Vincent [1]

[1] Laboratoire d'Informatique
E3i / Université de Tours
64 avenue Portalis, 37200 Tours - FRANCE
[2] AtosOrigin
19 rue de la Vallée Maillard
BP1311, 41013 Blois Cedex - FRANCE
(lefevre,vincent)@univ-tours.fr

Abstract

In this paper we are concerned with line detection for scene modelling. So we focus on horizontal and vertical lines and we propose a fast local approach to detect lines in binary images. The approach described here can easily be extended to lines characterised by other directions. Pixels are analysed using an accumulator on a block-based basis in order to obtain possible line segments for each block. As the results obtained rely only on a local analysis, their coherence can be further improved using a postprocessing step. The proposed method has been compared to classical approaches in order to show its efficiency.

1 Introduction

Video understanding relies on the analysis of the different objects composing the scene and of their relative position at a given time. These moving objects can be tracked using some adequate methods. In order to understand a video sequence, it is necessary to reposition these objects within the scene or background model. So we are looking for generical tools for background structure extraction. As we are dealing with video processing, we have also to take into account the real time constraint. Among features we can use for background structure modelling, we choose to focus on discontinuities and more precisely on lines rather than points or edges. Indeed vertical and horizontal lines are of great interest when dealing with artificial (or human built) environments.

The line detection process can be performed using local approaches or global ones, as the well-known Hough Transform [3] and its derivated [5]. As the computation time is a strong constraint to respect in our case, we propose to perform line detection on a local basis, instead of a global one. Only few local approaches (as [6]) were proposed in literature with regards to global ones.

Table of Contents based on page scanning

Pg 1 — Sébastien Lefèvre [1,2], Charles Dixon [1], Cédric Jeusse [1], Nicole Vincent [1]
Pg 1 — 1 Introduction
Pg 2 — 2 Classical Approaches for Line Detection
Pg 3 — 3 Block-based Line Segment Detection
Pg 3 — Figure 1: Spatial representation of regions $R_q$ corresponding to (a) vertical lines and (b) horizontal lines.
Pg 4 — 4 Filtering
Pg 4 — Figure 2: Pairs of neighbouring blocks $B_1B_3$, $B_2B_4$, and $B_3B_7$ used in filtering of a block containing horizontal line.
Pg 4 — The filtering step described here allows to increase coherence of line segments detected by our previous approach. We will now see the efficiency of the proposed approach compared to classical ones.
Pg 4 — 5 Results
Pg 5 — Figure 3: Original greylevel image (left) and binary edge image after thresholding result of Sobel operator (right).
Pg 5 — regions.
Pg 5 — Table 1: Description of the two sets of parameters used to obtain results presented in this paper.
Pg 6 — Figure 4: Results of proposed method without and with coherence verification and using $\Omega_5$ and $\Omega_8$.
Pg 6 — Figure 5: Results of edge linking method (a), use of orthogonal masks from Frei and Chen (b), and combination of horizontal and vertical masks (c).
Pg 7 — Figure 6: Original edge image (left) and result of Hough Transform (right) using XHoughTool as presented in [4].
Pg 7 — Figure 7: Results of proposed method without and with coherence verification and using $\Omega_5$ and $\Omega_8$.
Pg 8 — 6 Conclusion
Pg 8 — References
Pg 8 — [1] W. Frei and C. Chen. Fast boundary detection: A generalization and a new algorithm. *IEEE Transactions on Computer*, 26(10):988–998, Octobre 1977.
Pg 8 — [2] R. C. Gonzalez and R. E. Woods. *Digital Image Processing*. Addison-Wesley, 1992.
Pg 8 — [3] P. V. C. Hough. Methods and means for recognizing complex patterns. U.S. Patent n°3069654, Décembre 1962.
Pg 8 — [4] H. Kalviainen, P. Hirvonen, and E. Oja. Houghtool – a software package for the use of the hough transform. *Pattern Recognition Letters*, 17(8):889–897, 1996.
Pg 8 — [5] A. A. Kassim, T. Tan, and K. H. Tan. A comparative study of efficient generalised hough transform techniques. *Image and Vision Computing*, 17(10):737–748, Août 1999.
Pg 8 — [6] R. Shpilman and V. Brailovsky. Fast and robust techniques for detecting straight line segments using local models. *Pattern Recognition Letters*, 20:865–877, 1999.

*FIG. 3B*

DYNAMICALLY GENERATING TABLE OF CONTENTS FOR PRINTABLE OR SCANNED CONTENT

BACKGROUND

Systems and methods herein generally relate to automated creation of tables of contents of documents, and more particularly to methods and devices for dynamically generating tables of contents for printable or scanned content.

A table of contents is a useful part of a document, enabling many valuable features. For example, a table of contents helps outline and organize the content of the document, gives the reader a high-level view of the content in the document, etc.

Some document creation/editing applications (such as word processors, spreadsheet programs, presentation programs, graphic programs, etc.) include tools for automatically creating a table of contents. Such tools are commonly based on analyzing the electronic text representation, to determine text size, text styles, etc. However, for such tools to operate, the text must be in the form of an electronic code that represents characters. The electronic text representation can be with or without formatting.

With respect to text in electronic form, the American Standard Code for Information Interchange (ASCII) is a character-encoding scheme originally based on the English alphabet that encodes 128 specified characters—the numbers 0-9, the letters a-z and A-Z, some basic punctuation symbols, some control codes, and a blank space. In a character-encoding scheme, a series of 0's and 1's represent a character electronically. ASCII codes represent text in computers, communications equipment, and other devices that use text. Most modern character-encoding schemes are based on ASCII, though they support many additional characters.

As noted, the electronic text representation can be with or without formatting. For example, plain text is a pure sequence of character codes. Similarly, styled text, also known as rich text, is any electronic text representation containing plain text completed by information such as a language identifier, font size, color, hypertext links, etc.

However, for scanned topical items or topical items that are in print ready form (in connected component pixel format, rasterized format, etc.) such automated table of contents tools require that any text be converted into the electronic text representation (through, for example, optical character recognition (OCR) processing, etc.). Such conversion to electronic text representation is cumbersome, utilizes resources, has accuracy limitations, and looses any graphic topical items that accompany the text.

SUMMARY

Generally, exemplary methods herein receive a document comprising raster images, using an optical scanner. These methods automatically identify topical items within the raster images based on raster content in the raster images, using a processor. Further, these methods automatically associate the topical items with topics in the document based on previously established rules for identifying topical sections, and automatically crop the topical items from the raster images to produce cropped portions of the raster images, using the processor. These methods then automatically create an index for the document by combining the cropped portions of the raster images organized by the topics, using the processor, and output the cropped-image index from the processor.

More specifically, methods herein receive a document comprising raster images (by scanning using an optical scanner or otherwise) and automatically identify topical items within the raster images based on raster content in the raster images, using a processor. This process of identifying topical items does not need to use optical character recognition and, instead, can be performed purely upon recognition of graphical features (shapes, colors, pixel patterns, etc.).

These methods automatically rank the topical items based on previously established rules for identifying topical sections in documents, using the processor. Such methods then automatically filter the topical items based on the ranking process to identify the highest-ranking topical items, using the processor. Then, the methods automatically associate the highest-ranking topical items with topics and subtopics in the document based on the previously established rules, again using the processor.

Further, the methods automatically crop the highest-ranking topical items from the raster images to produce cropped portions of the raster images, using the processor. The cropped portions of the raster images can include both text and non-text features.

This permits such methods to automatically create a cropped-image index for the document by combining the cropped portions of the raster images organized by the topics and subtopics, using the processor. Because different cropped portions of the raster images are organized by the topics and subtopics in the cropped-image index, pages of the cropped-image index present different combinations of the cropped topical items from any individual pages of the document. These methods can also automatically identify page numbers of the document, using the processor, and when creating the cropped-image index, such methods can include the page numbers in the cropped-image index to correlate the cropped portions of the raster images with corresponding page numbers of the document. Subsequently, the cropped-image index is output from the processor.

Devices herein comprise, among other components, an optical scanner generating a document comprising raster images, and a processor. The processor automatically identifies topical items within the raster images based on raster content in the raster images, automatically ranks the topical items based on previously established rules for identifying topical sections in documents, and automatically filters the topical items based on the ranking to identify highest-ranking topical items. This allows the processor to automatically associate the highest-ranking topical items with topics and subtopics in the document (based on the previously established rules) to automatically crop the highest-ranking topical items from the raster images to produce cropped portions of the raster images, and to automatically create and output a cropped-image index for the document by combining the cropped portions of the raster images organized by the topics and subtopics.

These and other features are described in, or are apparent from, the following detailed description.

BRIEF DESCRIPTION OF THE DRAWINGS

Various exemplary systems and methods are described in detail below, with reference to the attached drawing figures, in which:

FIGS. 3A and 3B are schematic diagrams illustrating raster images and a crop-image index according to methods and devices herein;

DETAILED DESCRIPTION

As mentioned above, some document creation/editing applications include tools for automatically creating a table of contents. However, for scanned topical items or topical items that are in print ready form (e.g., in raster format, such as a bitmap, JPEG, TIFF, PNG, GIF, PDF, etc.); such automated table of contents tools require that any text be converted into the electronic text representation (through, for example, optical character recognition (OCR) processing, etc.). Such conversion to electronic text representation is cumbersome, utilizes resources, has accuracy limitations, and can loose any graphic topical items that accompany the text.

Therefore, the methods and devices herein provide the ability to generate a table of content for a scan copy of printed material, without converting the scan to electronic character format (using OCR, etc.). The methods and devices herein dynamically generate a table of contents from a raster image or a print-ready file using processes that identify a list of headings and sub-headings using imaging and/or training methods to generate a printable table of contents along with page references.

Figure 1:
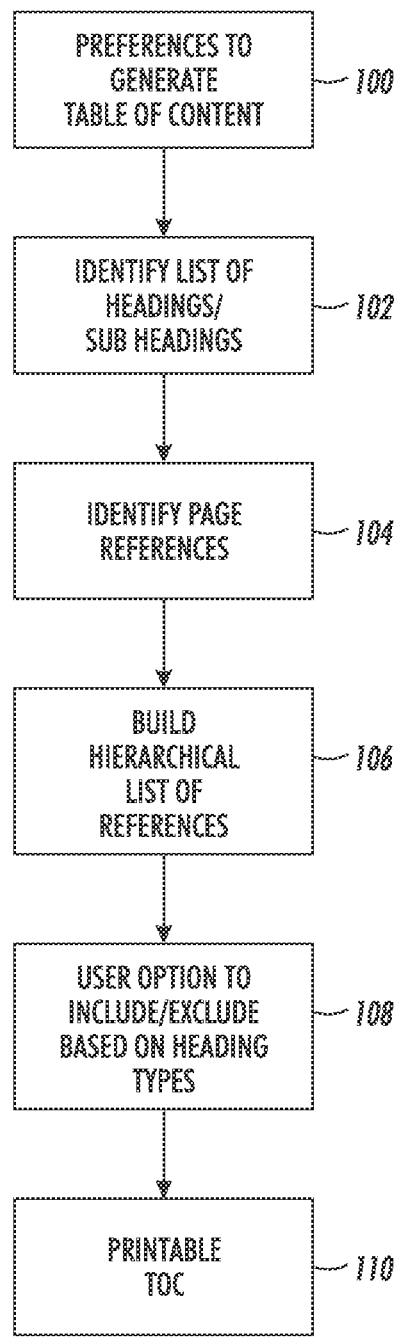
FIG. 1 is a flow diagram of various methods herein.

As shown in FIG. 1, the methods and devices herein auto-generate a table of contents for scanned copies of documents. In item 100, preferences that are used to generate the table of contents are established (or are obtained/modified from the user). The images from the documents are then analyzed to identify a list of headings and sub-headings in item 102 based on the preferences established in item 100. Item 104 identifies which headings and sub-headings are associated with specific pages of the document. Following that, in item 106 the methods and devices herein build a hierarchical list of references to the portions of the documents that could be included within the various headings and sub-headings identified in item 102. Then, using the hierarchical list of references obtained in item 106, options are presented to the user to include or exclude portions of the document within the various headings and sub-headings in item 108. With this information, the table of contents (in printable form) is produced in item 110.

The processing shown in FIG. 1 can be done locally at the printing/receiving device or can be done remotely using, for example, an extensible interface platform (EIP) application (e.g., server-based application). For example, this processing can be provided as a mobile app or network accessible application. Upon launch, the application prompts the user to place the printed papers in the feeder for receiving. Once receiving is all done, the scanned content is processed through the steps shown in FIG. 1 to identify a hierarchical list of headings and sub-headings along with reference page numbers (which are presented to the user as shown in item 108). If page numbers are not present in the printed material, the methods and devices herein can automatically generate serial page numbers that can be overlay-printed on to the physical copy.

Figure 2:
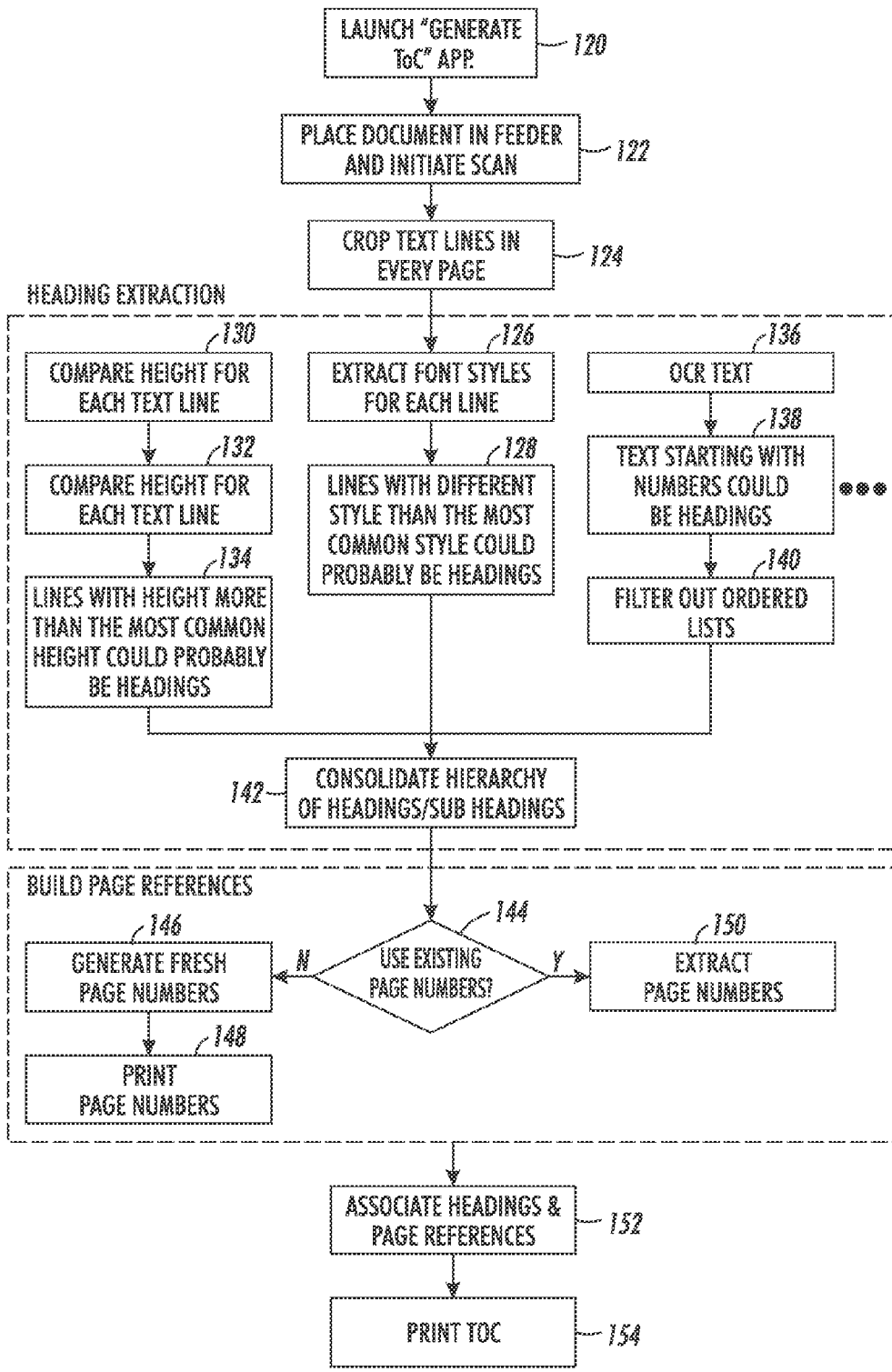
FIG. 2 is a flow diagram of various methods herein.

FIG. 2 displays the steps involved in generating a table of contents for printed material. More specifically, in item 120, the user launches the automated table of contents (TOC) application and subsequently places the document in the scanner to initiate the scan in item 122. In item 124, the processing crops the text lines on every page.

The processing in topical items 126-142 relates to heading extraction/identification within the document. More specifically, in item 126, the processing extracts font styles for each line based on the pixel patterns within the cropped text from item 124. In item 128, the processing identifies lines with a different style than the most common style as possible headings. In item 130-132, the height for each text line is sequentially compared and, in item 134 the lines that have a height that is more than the most common height also can be possible headings.

For cases where higher accuracy is needed, the system may also have an initial setup process (which may even be performed on a job-by-job basis) where the user teaches the system whether to look at font size or color or something else for different levels within table of contents. Thus, as one option, the text can be subjected to optical character recognition in item 136 (however, such processing is not mandatory and is only optional, and is only used to increase the accuracy of the remaining processing). If the optical character recognition is performed, the text that starts with numbers can be considered possible headings as shown in item 138. Similarly, in item 140, ordered lists can be filtered out. All such processing flows to item 142, which consolidates the hierarchy of headings and sub-headings.

Thus, there are various processes that can be combined together to identify the hierarchical list of headings & sub-headings. Some of the processes involve identifying numbered/bulleted text (ordered lists in the content can be excluded, which are mostly closely followed) identifying spacing between lines, identifying texts ending with colon, identifying left/center aligned text, capitalized text, different thickness of text, etc.

Items 144-150 relate to processes that build the page references. More specifically, in item 144, if optical character recognition is used, a determination is made as to whether to use the existing page numbers. If not, processing flows to item 146, which generates fresh (new) page numbers and item 148 illustrates that the page numbers are printed. If the existing page numbers are to be used in item 144, in item 150 those page numbers are extracted for use in the table of contents. Processing then flows to item 152, which associates the headings with the page numbers to complete the table of contents and, in item 154, the automatically generated table of contents is printed out.

With respect to the raster generated table of contents, FIGS. 3A-3B show identification of potential textual content (image of journal article to the left 160) and a dynamically generated table of contents from raster input, 162. As described above in FIG. 2, this raster image content can be pruned via rules to narrow down elements to be tagged for table of contents inclusion.

For the example shown in FIGS. 3A-3B, a 9-page journal publication from IEEE was used, as represented by one of the scanned pages 160. Data for the table of contents was identified only by raster content in the image. The subsequent table of contents 162 was generated using rasterized labeling for heading and page numbers with the actual table of contents entries being cropped images extracted from the original raster pages 160. The dynamically generated table of contents in FIGS. 3A-3B illustrate the types of content that can be extracted by methods and devices herein. Here, major section headings, figure descriptions, and citations where included in the table of contents 162. With the input preferences supplied in item 100 (FIG. 1), the topical items that will be included in the table of contents is personalized via preferences, or from a list of content found via the document analysis processing. No OCR content was involved in the processing used to generate the table of contents 162. However, as shown in items 136-140, discussed above with respect to FIG. 2, adding OCR analysis to semantically identify raster content from printed and scanned material can improve the automatically generated table of contents.

Thus, method and devices herein provide a hierarchical ordering of content distribution (that permit knowledge workers easily get a sense of content coverage), identify headings/sub-headings to foster leveraging of previously created libraries, and allow contents from various sources to be collated and then a single table of contents can be generated for use.

Figure 4:
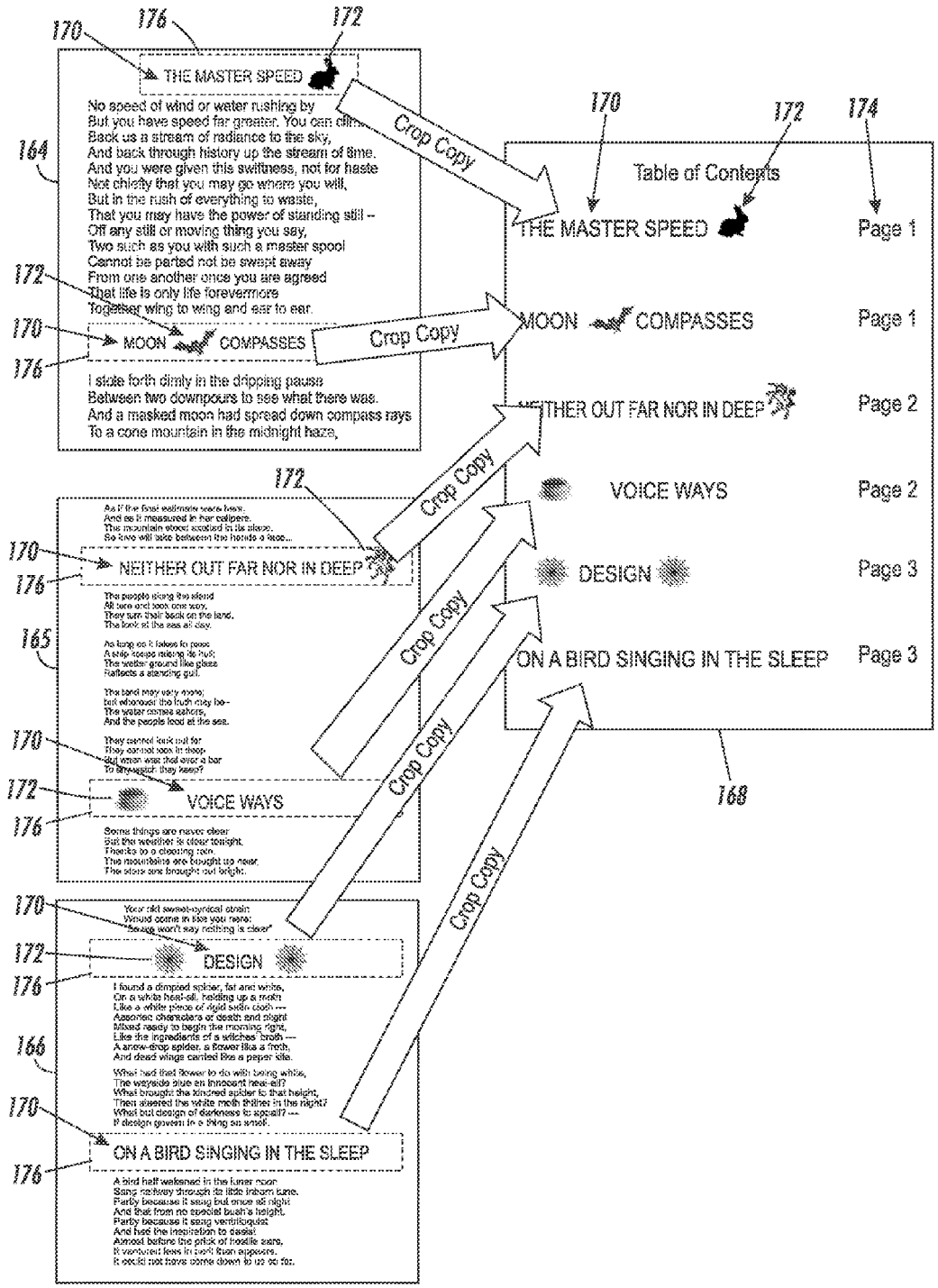
FIG. 4 is schematic diagram illustrating raster images and a crop-image index according to methods and devices herein.

FIG. 4 is another example illustrating raster images 164-166 scanned from printed pages of a book of poetry and the crop-image index 168 that is automatically created by the methods and devices herein. More specifically, the raster images 164-166 contain different poems, many of which include a title that includes text 170 that is presented in all capital letters using a different font when compared to the remainder of the document. Many of the titles also include one or more graphic item 172 that can be positioned before the text, in the text, after the text, surrounding the text, etc., as shown in raster images 164-166.

The methods and devices herein look at the pattern of pixels within the rasters 164-166 to identify raster areas 170, 172 as titles because these raster areas 170, 172 comply with certain pixel patterns rules (established or modified, for example, in item 100 in FIG. 1). For example, some of the pixel pattern rules that raster areas 170, 172 match are: groups of adjacent horizontal lines containing non-white pixels are bordered by groups of adjacent horizontal lines of all white pixels (indicating that the titles are spaced from remaining areas of text); consecutive non-white pixels in these horizontal lines occur in larger groups (indicating the likelihood of bold text, uppercase letters, larger fonts, etc.) relative to other groups of horizontal lines in the raster images 164-166; the halftoning densities in areas 170, 172 represent denser areas of non-white pixels (indicating the likelihood of bold text indicative of titles, etc.); etc.

While the example shown in FIG. 4 illustrates titles that all have the same hierarchical level within a given book, the book may also contain chapters, which can be distinguished from the titles of the poems according to even further refined pixel pattern rules. Therefore, while the table of contents 168 in FIG. 4 includes a list of headings; headings and sub-headings could be included in the table of contents. Further, in the simplified example presented in FIG. 4, three raster images 164-166 are sequentially received by the devices and systems herein, allowing the methods, devices, and systems herein to give each of the three raster images 164-166 a sequential page number beginning with page 1.

Once areas (containing items 170 and 172) of the raster images 164-166 are identified as heading (or sub-headings) these areas are cropped (as represented by dashed cropping lines 176). Note that the dashed cropping lines are not part of the raster images 164-166 and, instead, such dashed lines are only used in FIG. 4 to illustrate the areas that are cropped from the raster images 164-166. Further, the rules/user preferences provided in item 100 (FIG. 1) can define whether the graphic items 172 will be included within the table of contents 168. For example, the rules may only crop areas that contain pixel patterns consistent with shapes of letters, numbers, etc., in order to avoid including the graphic items 172 within the table of contents 168. To the contrary, alternative rules may provide that the cropped area include the entire page horizontal width, or a percentage thereof (e.g. 60%, 75%, 90%, etc.) to ensure that any graphic items 172 within the raster images will also be included within the table of contents 168.

As shown by the block arrows with the label "Crop Copy" in FIG. 4, copies of the cropped regions 176 are automatically pasted onto (e.g., copied onto) the table of contents page 168 in locations corresponding to the page number from which the cropped regions 176 were copied. The graphic items 172 included in the table of contents 168 shown in FIG. 4 allow the table of contents 168 to be more intuitive than tables of contents that only use text. By presenting graphical items 172 in the table of contents 168, a user is able to identify more quickly a topic of interest, may be able to remember more readily a topic of interest, etc. Further, such graphical items 172 in the table of contents 168 assist sight impaired individuals or individuals with reduced reading capability (e.g., young readers, poor readers, etc.) to identify more easily the section of the document where their interests may lie.

Figure 5:
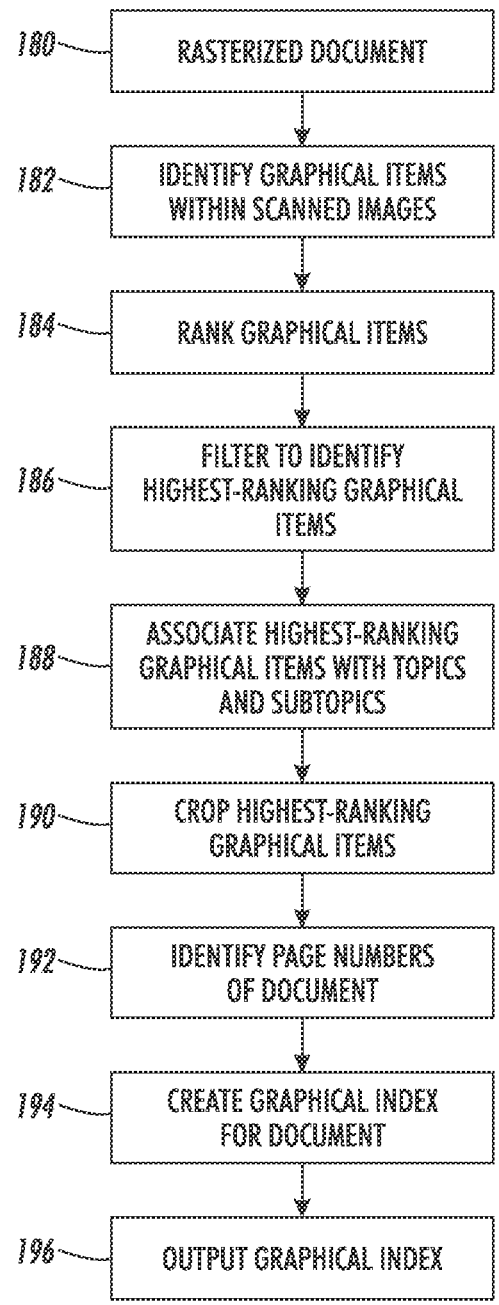
FIG. 5 is a flow diagram of various methods herein.

FIG. 5 is flowchart illustrating exemplary methods herein. In item 180, an image document is received (e.g., from a raster image processor, from an optical scanner, etc.). Therefore, the image document comprises raster or raster images. In item 182, such methods automatically identify topical items within the raster images based on raster content in the raster images, using a processor that can be operatively connected to the optical scanner (or the two can be totally disconnected). How the raster version of the document is acquired can be independent to the automated table of contents processing. For example, legacy raster documents, e.g., PDF's, can be independently processed via these methods for table of contents. This process of identifying topical items in item 182 is based upon matching previously established rules regarding the pattern of white and non-white pixels within the raster and, therefore, does not use optical character recognition and, instead, is performed purely upon recognition of graphical features (shapes, colors, pixel patterns, etc.).

Next, in item 184, these methods automatically rank the topical items based on previously established rules for identifying topical sections in documents, using the processor. As noted above, the rules can look for pixel patterns that indicate a logical hierarchical arrangement between the different headings (e.g., size of features based on non-white pixels, darkness of features based on non-white pixel spacing and halftoning characteristics, shape of features based on non-white pixel continuity, etc.) without converting the rasterized image into electronic characters.

While a few of the rules that are established, selected, or modified in item 100 in FIG. 1 (discussed above) have been mentioned in the examples provided herein; those ordinarily skilled in the art would understand that many more rules are provided by the devices, methods, and systems herein, and that the limited number of rules that have been mentioned in this disclosure are only provided as examples, and not as an exhaustive list of such rules.

Such methods then automatically filter the topical items in item 186, (based on the results of the ranking process in item 184) to identify the highest-ranking topical items and remove the lower-ranking topical items from consideration, using the processor. Such a ranking process 184 can provide a confidence measure regarding whether an area of the raster image is actually a heading or sub-headings. The filtering process in item 186 filters out those areas that have a confidence measure below a predetermined standard to make the table of contents more accurate. Then, in item 188, these methods automatically associate the highest-ranking topical items with topics and subtopics in the document (again based on the previously established rules, using the processor).

Further, in item 190, the methods automatically crop the highest-ranking topical items from the raster images to produce cropped portions of the raster images, using the processor. The cropped portions of the raster images can include both text 170 and non-text features 172. These methods can also automatically identify page numbers of the document, using the processor, in item 192.

This permits such methods to automatically create a cropped-image index for the document in item 194 by combining onto a new page the cropped portions of the raster images organized by the topics and subtopics, using the processor. Because different cropped portions of the raster images are organized by the topics and subtopics in the cropped-image index, pages of the cropped-image index present different combinations of the topical items from any individual pages of the document. If the methods automatically identify page numbers of the document, in item 192, when creating the cropped-image index in item 194, such method can include the page numbers in the cropped-image index to correlate the cropped portions of the raster images with corresponding page numbers of the document. Subsequently, the cropped-image index is output from the processor, as shown by item 196.

Figure 6:
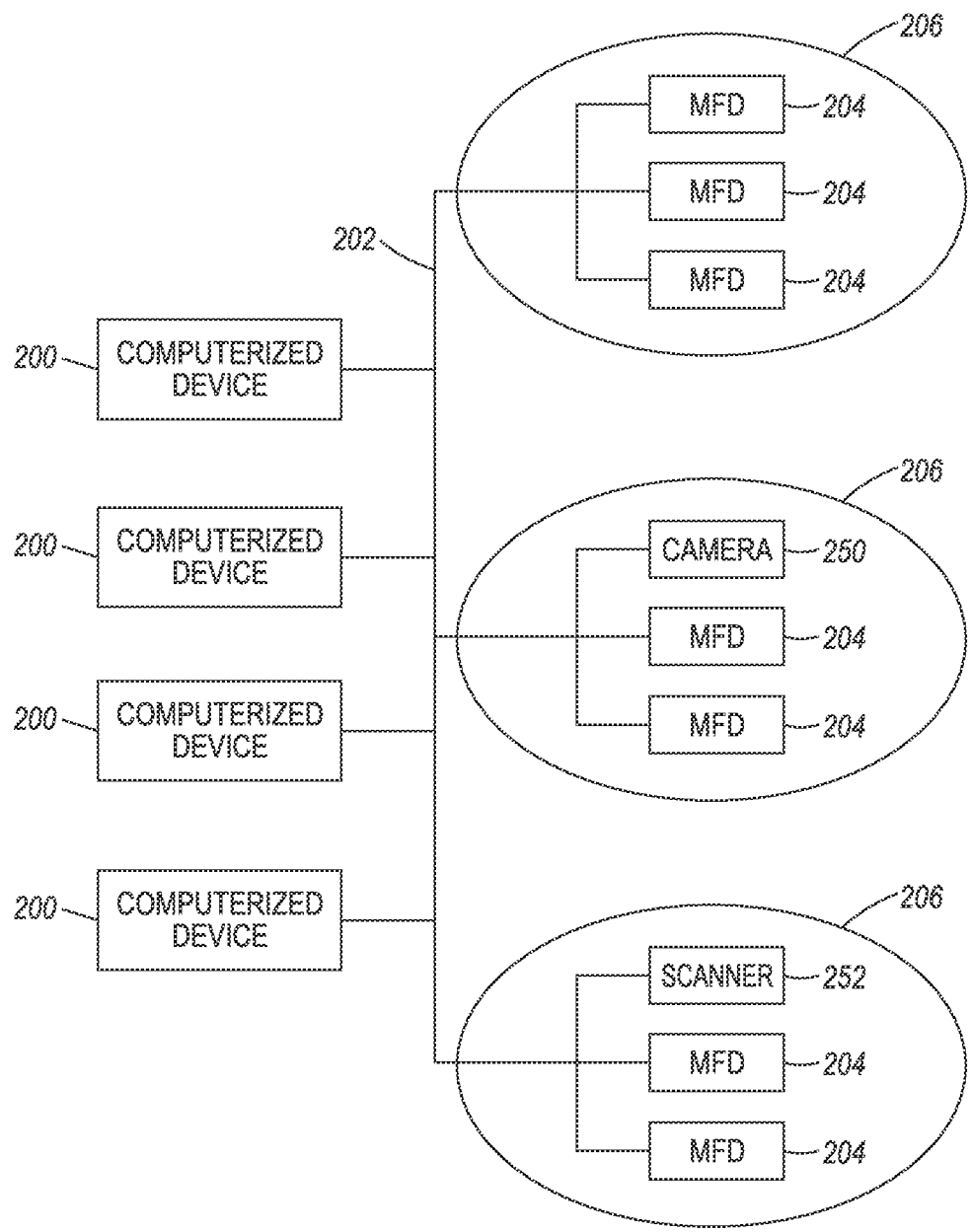
FIG. 6 is a schematic diagram illustrating systems herein.

As shown in FIG. 6, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202. Further, as illustrated, cameras 250, scanners 252, etc., can be utilized by methods and systems herein.

Figure 7:
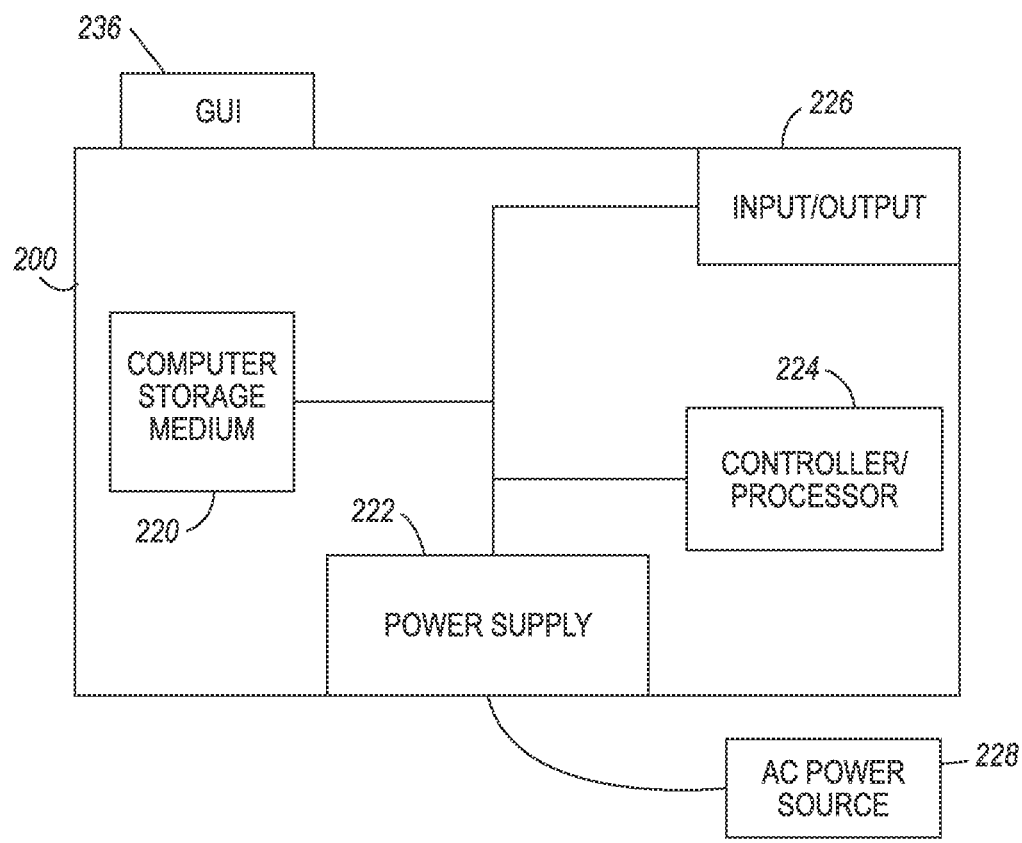
FIG. 7 is a schematic diagram illustrating devices herein.

FIG. 7 illustrates a computerized device 200, which can be used with systems and methods herein and can comprise, for example, a print server, a personal computer, a portable computing device, etc. The computerized device 200 includes a controller/tangible processor 224 and a communications port (input/output) 226 operatively connected to the tangible processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The tangible processor 224 controls the various actions of the computerized device. A non-transitory computer storage medium device 220 (which can be optical, magnetic, capacitor based, etc.) is readable by the tangible processor 224 and stores instructions that the tangible processor 224 executes to allow the computerized device to perform its various functions, such as those described herein. Thus, as shown in FIGS. 3A-3B, a body housing has one or more functional components that operate on power supplied from an alternating current (AC) source 228 by the power supply 222. The power supply 222 can comprise a power storage element (e.g., a battery, etc).

Figure 8:
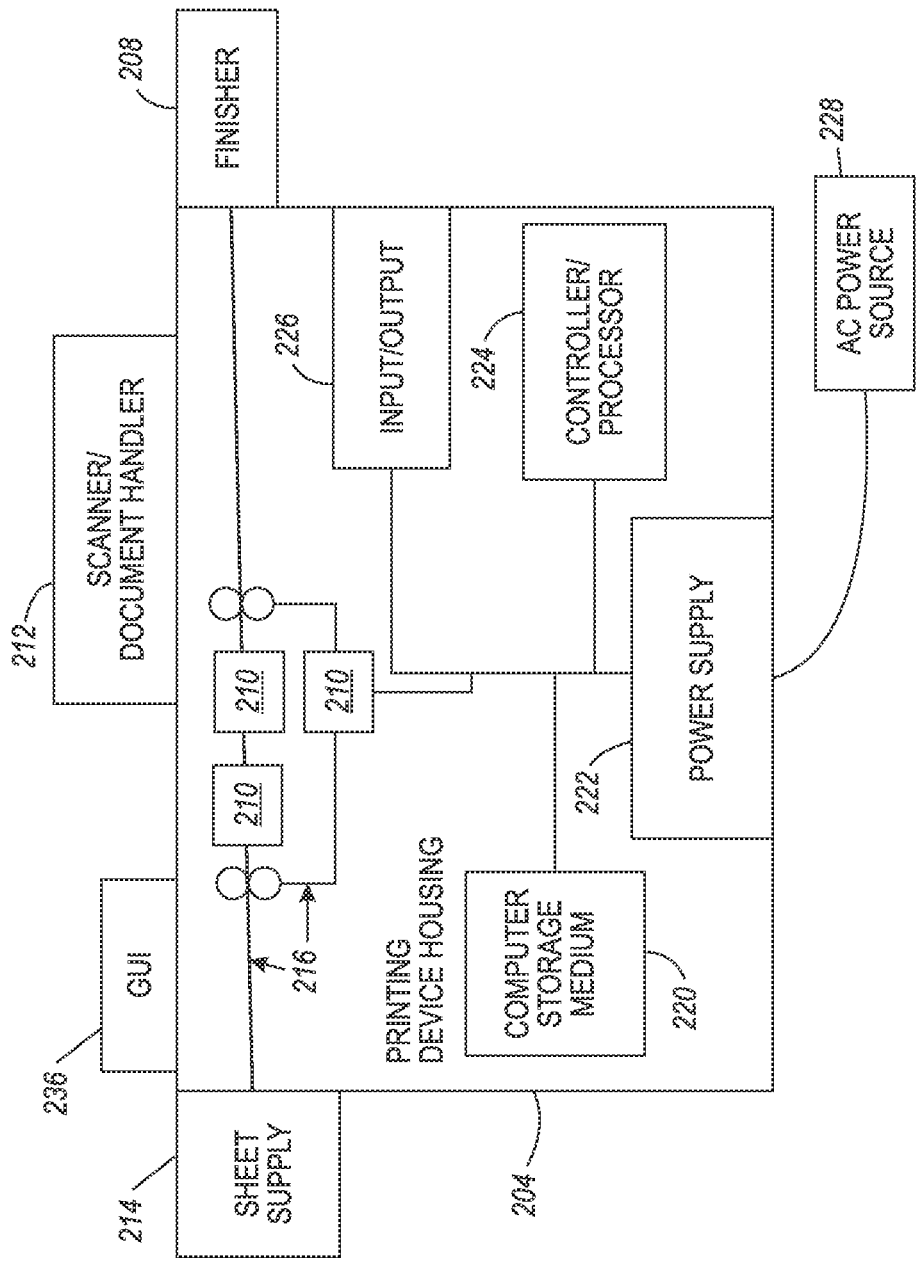
FIG. 8 is a schematic diagram illustrating devices herein.

FIG. 8 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the tangible processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Therefore, devices herein comprise, among other components, an optical scanner 212 receiving a document comprising raster images, and a processor 224 operatively connected to the optical scanner 212. The processor 224 automatically identifies topical items within the raster images based on raster content in the raster images, automatically ranks the topical items based on previously established rules for identifying topical sections in documents, and automatically filters the topical items based on the ranking to identify highest-ranking topical items. This allows the processor 224 to automatically associate the highest-ranking topical items with topics and subtopics in the document (based on the previously established rules), to automatically crop the highest-ranking topical items from the raster images to produce cropped portions of the raster images, and to automatically create and output a cropped-image index for the document by combining the cropped portions of the raster images organized by the topics and subtopics.

As would be understood by those ordinarily skilled in the art, the printing device shown in FIG. 8 is only one example and the systems and methods herein are equally applicable to other types of printing devices that may include fewer components or more components. For example, while a limited number of printing engines and paper paths are illustrated in FIG. 8, those ordinarily skilled in the art would understand that many more paper paths and additional printing engines could be included within any printing device used with systems and methods herein.

A raster image tangible processor (RIP) is a component used in a printing system that produces a raster image also known as a bitmap. The bitmap is then sent to a printing device for output. Raster image processing is the process that turns vector digital information into a high-resolution raster image.

A "pixel" refers to the smallest segment into which an image can be divided. Received pixels of an input image are associated with a color value defined in terms of a color space, such as color, intensity, lightness, brightness, or some mathematical transformation thereof.

The term halftoning means a process of representing a contone image by a bi-level image such that, when viewed from a suitable distance, the bi-level image gives the same impression as the contone image. Halftoning reduces the number of quantization levels per pixel in a digital image.

Over the long history of halftoning, a number of halftoning techniques have been developed which are adapted for different applications.

Traditional clustered dot halftones were restricted to a single frequency because they were generated using periodic gratings that could not be readily varied spatially. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell must contain groups of monochrome pixels within the same-sized cell area.

The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock, Tex., USA and Apple Computer Co., Cupertino, Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving a document using an optical scanner comprising raster images;
   automatically identifying topical items within said raster images based only on distinct font styles of images of text characters in said raster images, using a processor, said images of text characters being pixel-based and being distinct from recognized characters produced in optical character recognition processing;
   automatically ranking said topical items based on previously established rules for identifying topical sections in documents, using said processor;
   automatically filtering said topical items based on said ranking to identify highest-ranking topical items, using said processor;
   automatically associating said highest-ranking topical items with topics and subtopics in said document based on said previously established rules, using said processor;
   automatically cropping said highest-ranking topical items from said raster images by copying pixel patterns of said topical items within said raster images to produce cropped-image portions of said raster images, using said processor;

automatically creating a cropped-image index for said document by combining said cropped-image portions of said raster images organized by said topics and subtopics, using said processor, said cropped-image index comprising multiple ones of said cropped-image portions combined together and organized by said topics and subtopics; and outputting said cropped-image index from said processor.

2. The method according to claim 1, further comprising automatically identifying page numbers of said document, using said processor, said creating said cropped-image index including said page numbers in said cropped-image index to correlate said cropped-image portions of said raster images with corresponding ones of said page numbers of said document.

3. The method according to claim 1, pages of said cropped-image index each comprising a different combination of said topical items from any individual pages of said document.

4. The method according to claim 1, said cropped-image portions of said raster images comprising one of text and non-text features.

5. A receiving device comprising:

an optical scanner receiving a document comprising raster images; and a processor operatively connected to said optical scanner, said processor automatically identifying topical items within said raster images based only on distinct font styles of images of text characters in said raster images, said images of text characters being pixel-based and being distinct from recognized characters produced in optical character recognition processing, said processor automatically ranking said topical items based on previously established rules for identifying topical sections in documents, said processor automatically filtering said topical items based on said ranking to identify highest-ranking topical items, said processor automatically associating said highest-ranking topical items with topics and subtopics in said document based on said previously established rules, said processor automatically cropping said highest-ranking topical items from said raster images by copying pixel patterns of said topical items within said raster images to produce cropped-image portions of said raster images, said processor automatically creating a cropped-image index for said document by combining said cropped-image portions of said raster images organized by said topics and subtopics, said cropped-image index comprising multiple ones of said cropped-image portions combined together and organized by said topics and subtopics, and said processor outputting said cropped-image index.

6. The receiving device according to claim 5, said processor automatically identifying page numbers of said document, said processor creating said cropped-image index by including said page numbers in said cropped-image index to correlate said cropped-image portions of said raster images with corresponding ones of said page numbers of said document.

7. The receiving device according to claim 5, pages of said cropped-image index each comprising a different combination of said topical items from any individual pages of said document.

8. The receiving device according to claim 5, said cropped-image portions of said raster images comprising one of text and non-text features.

* * * * *